United States Patent Office 3,541,118
Patented Nov. 17, 1970

1

3,541,118
3 - ALKOXYALKOXY - 13 - ALKYLGONA - 1,3,5(10)-TRIENES UNSATURATED AT THE DELTA-6-, DELTA-7-, DELTA-8(9)-, DELTA-9(11)- AND DELTA-6,8(9)-POSITIONS AND 8-ISOGONA ANALOGS THEREOF
Harshavadan C. Shah, Philadelphia, Reinhardt P. Stein, Conshohocken, and Herchel Smith, Wayne, Pa., assignors to American Home Products Corporation, New York, N.Y., a corporation of Delaware
No Drawing. Continuation-in-part of application Ser. No. 814,447, Apr. 8, 1969. This application May 19, 1969, Ser. No. 825,961
Int. Cl. C07c 169/08, 169/10
U.S. Cl. 260—397.4         10 Claims

ABSTRACT OF THE DISCLOSURE

Novel $\Delta^6$-, $\Delta^7$-, $\Delta^{8(9)}$-, $\Delta^{9(11)}$- and $\Delta^{6,8(9)}$-dehydro-3-(alkoxyalkoxy)-13-alkylgona-1,3,5(10)-trienes and 8-isogona analogs thereof (I) are hormonally active, especially estrogenically and anti-lipemically. Compounds (I) are provided by alkylating an active metal derivative of a 3-hydroxyl group in the corresponding A-ring aromatic steroid with a (lower)alkyl halo(lower)alkyl ether.

This application is a continuation-in-part of copending application Ser. No. 814,447 filed on Apr. 8, 1969 and now abandoned.

This invention is concerned with steroid compounds useful in therapy and as intermediates for therapeutically useful compounds. More particularly, it relates to new and useful 3-alkoxyalkoxy-substituted A-ring aromatic steroids, either unsaturated in the B- and C-rings or the 8-isogona analogs thereof. The compounds are estrogenically and anti-lipemically-active and are important intermediates for the preparation of biologically-active steroids. More particularly, in comparison with the corresponding 3-alkoxy and 3-hydroxy steroids of the prior art, the biological activity of the instant 3-alkoxyalkoxy compounds is considerably different, in that oral estrogenic activity is of increased duration and the anti-lipemic activity is strongly enhanced. These activities are evidenced, for example, by the ability of the instant compounds to reduce blood cholesterol levels in both normal and hypercholesterolemic rats. In addition, the instant compounds have a beneficial effect in inhibiting blood platelet loss induced by adenosine diphosphate (ADP) in rats.

DESCRIPTION OF THE INVENTION

The compounds contemplated by this invention are $\Delta^6$-, $\Delta^7$-, $\Delta^{8(9)}$-, $\Delta^{9(11)}$-, or $\Delta^{6,8(9)}$-dehydro 3-(lower)alkoxy (lower)alkoxy-13-alkylgona-1,3,5(10)-triene compounds and 8-isogona analogs thereof of Formula I:

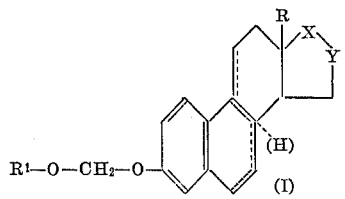

(I)

wherein R and $R^1$ are lower)alkyl; X is

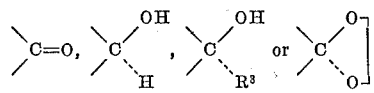

2

$R^3$ is (lower)alkyl, (lower)alkenyl, (lower)alkynyl or halo(lower)alkynyl; Y is methylene or hydroxymethylene; and the broken lines indicate unsaturation.

Special mention is made of a number of important embodiments of the instant invention:
These are respectively:

dl-3-(methoxymethoxy)estra-1,3,5(10),8-tetraen-17-one;
dl-3-(methoxymethoxy)-17α-ethynylestra-1,3,5(10),8-tetraen-17β-ol;
dl-13-ethyl-3-(methoxymethoxy)-8α-gona-1,3,5(10)-trien-17-one;
dl-13-ethyl-3-(methoxymethoxy)-17α-ethynyl-8α-gona-1,3,5(10)-trien-17β-ol;
d-3-(methoxymethoxy)estra-1,3,5(10),8-tetraen-17-one;
d-3-(methoxymethoxy)-17α-ethynylestra-1,3,5(10),8-tetraen-17β-ol;
d-17α-ethynyl-3-(methoxymethoxy)-8α-estra-1,3,5(10)-trien-17β-ol;
d-13-ethyl-17α-ethynyl-3-(methoxymethoxy)-8α-gona-1,3,5(10)-trien-17β-ol; and
d-13-ethyl-3-(methoxymethoxy)-17α-methyl-8α-gona-1,3,5(10)-trien-17β-ol.

A preferred family of steroids within the scope of this invention are those of Formula I above wherein the R substituent is polycarbon(lowed)alkyl. This subgenus comprises steroids with an unexpected and useful separation in hormonal properties, not possessed by those in which R is methyl.

In this specification and in the appended claims the term "(lower)alkyl" contemplates saturated hydrocarbon radicals, straight and branched chain, having from 1 to about 6 carbon atoms and includes, for example, methyl, ethyl, n-propyl, i-propyl, n-butyl, t-butyl, n-pentyl, n-hexyl, 3-methylpentyl and the like. The term "polycarbon(lower)alkyl" contemplates groups containing from about 2 to about 6 carbon atoms, as illustrated for (lower)alkyl above, but excludes, of course, methyl. The term "(lower)alkenyl" contemplates mono-olefinic polycarbon(lower)alkyl groups, preferably those in which the unsaturation is α- to the point of attachment to the steroid ring, and especially preferably, the vinyl group. The term "(lower)alkynyl" contemplates polycarbon(lower)alkyl groups containing one carbon-to-carbon triple bond, preferably those in which the unsaturation is α- to the point of attachment to the steroid ring, and especially preferably the ethynyl group. The term "halo(lower)alkynyl" contemplates (lower)alkynyl groups monosubstituted with chloro, fluoro, bromo or iodo, preferably the chloroethynyl group. The term "alkali metal" contemplates active metals of the family of monovalent elements of the first group of the periodic system, e.g., Li, Na, K, Rb, and Cs. Preferred alkali metals are lithium, sodium and potassium; especially preferred is sodium. The term "alkaline earth metal" contemplates active metals of the family of divalent elements of the second group of the periodic system, e.g., magnesium and calcium. The term "(lower)alkoxy(lower)alkoxy" contemplates in its broadest aspects substituents of the formula:

$$R^1—O—CH(R^5)—O—$$

wherein $R^1$ is as above defined and $R^5$ is hydrogen or methyl; (lower)alkoxy-methoxy is preferred, and methoxymethoxy is especially preferred.

Compounds of Formula I can be obtained in a number of ways. One especially useful procedure for obtaining the instant compounds comprises alkylating in an aprotic medium a corresponding aromatic steroidal salt of Formula II:

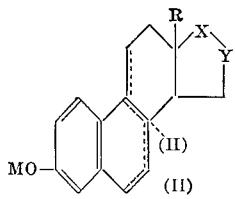

wherein R, X and Y are as defined above and M is an ion derived from an alkali metal or an alkaline earth metal, with a (lower)alkyl halomethyl ether of the formula:

$$R^1\text{—O—}CH_2\cdot hal$$

wherein hal is chloro, bromo, iodo or fluoro, until formation of the 3-(lower)alkoxy(lower)alkoxy group in compounds of Formula I is substantially complete.

The aromatic steroidal salts used as starting materials herein can be prepared by techniques known to those skilled in the art. For example, the corresponding 3-hydroxy A-ring aromatic steroid is reacted with an alkali metal- or alkaline earth metal alkoxide in an alcohol, preferably, for example, with sodium methoxide in methanol, followed by complete removal of the alcohol, for example, by distillation under reduced pressure to provide the dry aromatic steroidal salt (II). These techniques will be illustrated in detail hereinafter. The required 3-hydroxy A-ring aromatic steroids are commercially available or can be prepared by techniques known to those skilled in the art. For example, $d(+)$-estra-1,3,5(10),7-tetraene-3,17β-diol, also known as $d(+)$-17β-dihydro equilin (a 7-dehydro analog wherein R is methyl, X is hydroxymethylene and Y is methylene) and related compounds are prepared by converting a 13-alkylgona-1,3,5(10), 8-tetraene having at least one hydrogen at the 7-position (U.S. 3,391,169) to the corresponding 8,9-epoxygona-1,3,5(10)triene; opening the epoxide ring to form an 8-hydroxygona-1,3,5(10),9(11)-tetraene; selectively catalytically hydrogenating the 9(11)-unsaturation; and dehydrating across the 7,8-position, for example, by methods exemplified by R. P. Stein, G. C. Buzby, Jr., and Herchel Smith in copending U.S. patent application Ser. No. 760,212 filed Sept. 16, 1968.

The 13-alkyl-8-isogona-1,3,5(10)-trien-3-ols are prepared by means exemplified by Gordon Alan Hughes and Herchel Smith in U.S. Pat. No. 3,407,217.

The 13-alkylgona-1,3,5(10),8(9)-tetraen-3-ols are prepared by means exemplified by Gordon Alan Hughes and Herchel Smith in U.S. Pat. No. 3,391,169, and in British Pats. 991,594 and 1,024,911.

The 13-alkylgona-1,3,5(10),9(11)-tetraen-3-ols are prepared by means exemplified by Gordon Alan Hughs and Herchel Smith in U.S. Pat. No. 3,391,170.

The 13-alkylkona-1,3,5(10),6,8(9)-pentaen-3-ols are prepared by reacting a 13-alkylgona-1,3,5(10),8-tetraene (U.S. 3,391,169) with a peracid to form a 8,9-epoxygona-1,3,5(10)-triene, and reacting this with a mineral acid, for example, by means exemplified by R. P. Stein, R. C. Smith and H. Smith in copending U.S. patent application Ser. No. 647,910, filed June 22, 1967, now U.S. Pat. No. 3,-475,468 patented Oct. 28, 1969.

The 13-alkylgona-1,3,5(10),6-tetraen-3-ols can be prepared from the 3-methoxy-13-alkylgona-1,3,5(10)-trienes of Ser. No. 534,353, filed Mar. 15, 1966 by introducing a 6-keto group with t-butyl chromate in carbon tetrachloride, reduction to the 6-ol with a hydride, such as sodium borohydride, and dehydrating, as with $POCl_3$ in dimethylformamide, or p-toluenesulfonic acid (or iodine) in refluxing benzene to introduce the double bond between $C_6$ and $C_7$, according to procedures such as those described in G. C. Buzby, Jr., G. H. Douglas, C. R. Walk and H. Smith, Excerpta Medica Int. Cong. Series No. 132 Proceedings of the Second Int. Congress on Hormonal Steroids, Milan, May 1966, p. 311; then cleaving the 3-methoxy group in a known way, e.g., by refluxing with pyridine hydrochloride or by cleavage with a Grignard reagent according to R. P. Stein, G. C. Buzby, Jr. and H. Smith, copending U.S. patent application, Ser. No. 694,036, filed Dec. 28, 1967 now U.S. Pat. No. 3,436,411.

Introduction of the 16α- or β-hydroxy group can be accomplished in known ways. For example, the substrates are oximated in the presence of an alkyl nitrite and the 16-oximino compound is hydrolyzed, for instance by reduction with zinc and a lower alkonoic acid to give a 16-ketone. This can be reduced to the 16α-ol for instance with an alkali metal and lower alkanol or by catalytic hydrogenation to give the 16β-ol. These methods are exemplified in U.K. 1,115,954.

The (lower)alkyl halomethyl ethers are available or can be prepared by means known to those skilled in the art. For instance, chloromethyl methyl ether is an item of commerce and can be prepared by reacting paraformaldehyde, methanol and hydrogen chloride. The other ethers are described in the literature, e.g., bromomethyl methyl ether, C.A. 47:9294a;
fluoromethyl methyl ether, C.A. 50:13716d;
iodomethyl methyl ether, C.A. 47:9294b;
chloromethyl ethyl ether, C.A. 47:3223d;
chloromethyl propyl ether, C.A. 46:10096f; and
bromomethyl isopentyl ether, C.A. 43:2926c.

The term "aprotic medium" when used herein is contemplated in its broadest sense. That is it includes diluents and suspending agents which are inert, i.e., incapable of reacting with either reactive reagent, i.e., the dry aromatic steroidal salt or the (lower)alkyl halomethyl ether. Those skilled in the art will immediately recognize that the term includes hydrocarbons, aliphatic, such as hexane, heptane, and the like, as well as aromatic, such as benzene, toluene, xylene, and the like; together with ethers, such as isopropyl ether, isobutyl ether, 1,2-dimethoxyethane, tetrahydrofuran, dioxane, and the like, chlorinated hydrocarbons, such as methylene chloride, chloroform, ethylene dichloride, and the like; sulfoxides, such as dialkylsulfoxides; and amides, such as dialkylamides. Excluded, of course, would be alcohols, acids, water, amines and other protonic media. Preferred aprotic media are chloroform, tetrahydrofuran, benzene, dimethylformamide, dimethylsulfoxide and 1,2-dimethoxyethane.

In carrying out the process, the aromatic steroidal salt is alkylated in an aprotic medium with the (lower)alkyl halomethyl ether at a temperature ranging from somewhat below room temperature to somewhat elevated temperatures until alkylation is substantially complete, followed by a conventional isolation procedure to obtain on work-up the corresponding alkoxymethoxy A-ring aromatic product. Even if X and/or Y are hydroxymethylene in the substrate, under the conditions to be described, very little tendency is observed for any reaction between non-aromatic hydroxyl groups and the alkoxy halomethyl ether reagent. The temperature at which the alkylation is carried out is at least high enough to permit completion of the reaction in a reasonable length of time, but not so high as to permit side reactions or decomposition of the reagents or products. The preferred temperature range is from about 20° C. to about 100° C. and this provides complete reaction in times ranging from about 2 hours to about 48 hours. In one convenient manner of proceeding, the aromatic steroidal salt is suspended in from about 10 to about 50 parts by volume of the aprotic medium per part by weight of steroid and treated with a solution the alkoxy halomethyl ether (an excess can be used) in about 5 parts by volume of an aprotic solvent per part by weight of alkoxy halomethyl ether. The mixture is allowed to stand until the reaction is substantially complete—for example, with most substrates, the mixture can be kept at room temperature (about 23° C.) for about 12 hours and alkylation is complete. The product is recovered by any conventional means. One useful general process is to extract the reaction mixture with an aqueous base (e.g., 1 N KOH), if a water-immiscible aprotic solvent was used (such as chloroform), then evaporate the dried, extracted reaction mixture to dryness. This leaves the product as a residue. It can be purified, if desired, by trituration, chromatography and recrystallization, e.g., from a lower alkanol, such as methanol, or from hexane.

As will be obvious to those skilled in the art after reading this disclosure, the basic process will provide 3-(lower)alkoxyalkoxy steroids which can be modified in known ways in subsequent steps to provide transformations at C–16 and C–17—some of these embodiments will be exemplified in detail hereinafter. For example, a 17-keto group can be converted by reduction to a 17β-hydroxy group or by ketalization with a ketalizing alcohol to a 17-ketal. If desired, a 17-keto group can be converted to a 17α-alkyl, alkenyl-, alknyl- or haloalkynyl-17β-ol group in known ways. And again, if desired, a 16-methylene group will be converted to a 16-hydroxymethylene group. The invention also contemplates compounds provided by the basic process including such subsequent steps of converting the "intermediate" 3-(lower)alkoxymethoxysteroid to the products when carried out separately.

The time and temperature ranges used in describing the aforementioned process steps simply represent the most convenient ranges consistent with carrying out the reaction in a minimum of time without undue difficulty. Thus, reaction temperatures appreciably below these can be used, but their use considerably extends the reaction time. Similarly, reaction temperatures higher than those mentioned can be employed with a concomitant decrease in reaction time, although purity of the product may be somewhat decreased.

Patent and publication sources for the starting materials have been specified hereinabove. Generally, starting materials for these can be prepared by totally synthetic processes in the 13-methyl series described by Douglas, Graves, Hartley, Hughes, McLoughlin, Siddall and Smith in J. Chem. Soc., 1963, pages 5077–94, and in the 13-polycarbonalkyl series described by H. Smith, Hughes, Douglas, Wendt, Buzby, Edgren, Fisher, Foell, Gadsby, Hartley, Herbst, Jansen, Ledig, McLoughlin, McMenamin, Pattison, Phillips, Rees, Siddall, Suida, L. Smith, Tokolics and Watson in J. Chem. Soc., 1964, pages 4472–4492.

In the product of a total synthesis which has not included a suitable resolution stage the compounds of the invention will be present as racemates. Using a convention approved by Fieser and Fieser, "Steroids," p. 336 (1959), the compounds designated as the $d$-forms are the enantiomers corresponding in configuration at C–13 to that of the natural hormone estrone. The corresponding enantiomorphs are consequently designated the $l$-forms and the racemates the $dl$-forms. Racemates will be depicted by structural formulas which show only the enantiomorphs of the $d$-configuration.

As is mentioned hereinabove, the compounds of Formula I of this process have estrogenic and anti-lipemic activity. This makes them useful to treat conditions in mammals responsive to treatment with estrogenic drugs such as for example, menopause, senile vaginitis, kraurosis vulvae, pruritis vulvae and the like. In addition they are useful to lower blood lipid level of mammals and can be used whenever anti-lipemic agents are indicated, such as in the treatment of various hyperlipidaemias or where the incidence of atherosclerosis is to be minimized. The products of Formula I are also useful as intermediates for the preparation of other steroids, which have hormonal or other useful activities.

The products of Formula I of this invention can be used in association with a pharmaceutically acceptable carrier. They can be formulated in liquid or solid forms, for instance as capsules, tablets, suppositories, powders, dispersible granules, cachets, and the like by combining them with conventional carriers. Such conventional carriers include magnesium carbonate, or stearate, talc, sugar, lacetose, pectin, dextrin, starch, gelatin, tragacanth, methyl cellulose, sodium carboxymethyl cellulose, low melting wax or cocoa butter. Diluents, flavoring agents, solubilizers, lubricants, suspending agents, binders or tablet-disintegrating agents can be used. Powders or tablets preferably contain 5 or 10 to 99% of the active constituent. The active steroid can be formulated with an encapsulating material with or without other carriers.

Liquid preparations such as solutions, suspensions or emulsions can also be used. Such preparations include disperions in a pharmaceutically acceptable carrier such as arachis oil or sterile water, preferably containing a non-ionic surface active agent such as fatty acid esters of polyhydroxy compounds, e.g., sorbitan, aqueous starch in sodium carboxymethylcellulose solutions, aqueous propylene glycol or polyethylene glycol. Thus a water-propylene glycol solution can be used for parenteral injection and aqueous suspensions suitable for oral use can be made by utilizing natural or synthetic gums, resins, methyl cellulose or other well known suspending agents.

The composition can be in unit dose form in which the dose unit is for instance from about 0.1 to about 200 mg. of each active steroid. The unit dose form can be a packaged composition, e.g., packeted powder, vials or ampules or, for example, in the form of capsules, cachets or tablets or any number of these in packaged form. The pharmaceutical compositions can also consist substantially solely of the active steroid when this is in unit dose form. When used for the purposes stated above, the dosage of the compounds will vary with the condition being treated, but a good starting dosage in general will be in the range established for estradiol (Merck Index Seventh Edition, p. 416 (1969)).

Merely by way of illustration, in a standard anti-lipemic assay in male weanling rats of about 100 g. mean body weight fed on a hypercholesterolemic diet for three weeks, $dl$-13-ethyl-3-(methoxymethoxy) - 17α - ethynyl-8α-gona-1,3,5(10)-trien-17β-ol demonstrated significant lowering of the serum cholesterol level following administration of 0.2 mg. perorally.

Of course, as will be clear to those skilled in the art, in addition to substrates designated by the formula above, the preferred process broadly can be applied to obvious chemical equivalents thereof but differing therefrom in the sense of having other functional groups attached to the steroid nucleus, whenever such groups do not themselves interfere or become affected by the process, unless, in exceptional instances, this is a desired effect. Similarly, the steroid nucleus may contain any substitution at positions other than at 16 or 17, as, for example, 6-methyl. Broadly stated, therefore, useful substrates would be represented by the formula

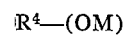

wherein M is an ion derived from an alkali metal or an alkaline earth metal and $R^4$ is a cyclopentanoperhydrophenanthrene nucleus, with an aromatic A-ring monosubstituted by —OM and which, on alkoxymethylation of the —OM group, would provide a product of Formula I with anti-lipemic and estrogenic activity.

DESCRIPTION OF THE PREFERRED EMBODIMENTS

The following examples are given by way of illustration and are not to be construed as limitations of this invention, variations of which are possible without departing from the scope and spirit thereof.

EXAMPLE 1

$dl$-3-(methoxymethoxy)estra-1,3,5(10),8-tetraen-17-one

Add slowly, 2.95 g. of $dl$-3-hydroxyestra-1,3,5(10),8-tetraen-17-one to a stirred solution of sodium methoxide (0.6 g.) in methanol (30 ml.). Stir an additional ½ hr. then remove the methanol in vacuo. Suspend the dry salt in 25 ml. tetrahydrofuran (THF), then add a solution of chloromethyl methyl ether (0.9 ml.) in THF (5 ml.). Allow the mixture to stand at about 23° C. for 24 hours. Filter the insoluble material, remove the THF in vacuo and triturate the residue with benzene. Filter the suspension through a column of fluosilicate and remove the solvent in vacuo. Recrystallize the residue from methanol to get the pure title product (0.55 g.), M.P. 103–107° C.

$\lambda_{max.}^{KBr}$ 5.79μ, $\lambda_{max.}^{EtOH}$ 268 mμ (14,500).

*Analysis.*—Calcd. for $C_{20}H_{24}O_3$ (percent): C, 76.89; H, 7.74. Found (percent): C, 77.19; H, 7.66.

EXAMPLE 2 dl-3-(methoxymethoxy)-17α-ethynyl-estra-1,3,5(10),8-tetraen-17β-ol

Dissolve 1.8 g. of dl-3-(methoxymethoxy)estra-1,3,5 (10),8-tetraen-17-one in dimethyl sulfoxide (DMSO), (30 ml.) in a 3 necked flask equipped with drying tube, magnetic stirrer and a gas inlet. Saturate the suspension with acetylene gas by bubbling in the dry gas for 1 hour. Add two aliquots (of 1.25 g. each) of lithium acetylide-ethylene diamine complex 1½ hours apart, then stir a further 1½ hours. Pour the mixture into ice water. Extract the mixture with ether and evaporate the dry extract in vacuo. Dissolve the residue in ether, filter through a cotton plug then evaporate the ether. Pump the residue to a glass to obtain 400 mg. of title product, $\lambda_{max.}^{KBr}$ 3.07μ

EXAMPLE 3 dl-13-ethyl-3-(methoxymethoxy)-8α-gona-1,3,5(10)-trien-17-one

Add sodium methoxide (0.7 g.) to anhydrous methanol (20 ml.). To the stirred solution add dl-13-ethyl-3-hydroxy-8α-gona-1,3,5(10)-trien-17-one (3.0 g.) stir an additional ten minutes after complete addition. Remove the solvent in vacuo, triturate the residue with ether and remove the ether in vacuo. To the dry residue add THF (35 ml.) followed by THF (10 ml.) containing chloromethylmethyl ether (1.0 ml.). Allow the mixture to stand at room temperature for 24 hours. Filter, remove the solvent from the filtrate in vacuo. Dissolve the residue in benzene and filter through a column of fluosilicate. Remove the solvent in vacuo, boil the residue with hexane and filter. Remove the solvent from the filtrate in vacuo, scratch the chilled residue then add methanol and filter to get 1.8 g. of title product, M.P. 56–63° C. Obtain an analytical sample by recrystallization from methanol, M.P. 70–74° C.

$\lambda_{max.}^{KBr}$ 5.81μ

*Analysis.*—Calcd. for $C_{21}H_{28}O_3$ (percent): C, 76.79; H, 8.59. Found (percent): C, 76.51; H, 8.81.

EXAMPLE 4 dl-13-ethyl-3-(methoxymethoxy)-17α-ethynyl-8α-gona-1,3,5(10)-trien-17β-ol

Suspend dl-13-ethyl-3-(methoxymethoxy) - 8α - gona-1,3,5(10)-trien-17-one (2.3 g.) in DMSO (30 ml.) in a 3 necked flask equipped with a drying tube, magnetic stirrer and a gas inlet. Saturate with acetylene gas by bubbling the dry gas through the suspension for 1 hour. Add two aliquots (of 1.25 g. each) of lithium acetylide-ethylene diamine complex 1½ hours apart then stir a further 1½ hours. Pour the mixture into ice water. Extract the mixture after 1 hour with ether. Evaporate the dry extract in vacuo. Pump the residue dry to get 1.1 g. of the title product, $\lambda_{max.}^{KBr}$ 2.97μ

EXAMPLE 5 d-3-(methoxymethoxy)estra-1,3,5(10),8-tetraen-17-one

Add dry sodium methoxide (0.6 g.) to anhydrous methanol (40 ml.). To the stirred solution add d-3-hydroxyestra-1,3,5(10),8-tetraen-17-one (2.4 g.) and slowly stir for an additional ½ hour, then remove the methanol in vacuo. Suspend the dry residue in 25 ml. of THF and add a solution of chloromethylmethyl ether (0.9 ml.) in THF (5 ml.) and let stand at about 23° C. for 24 hours. Filter and remove the solvent in vacuo. Dissolve the residue in benzene and pass through a column of fluosilicate. Remove the solvent in vacuo and crystallize the residue from methanol to give 775 mg. of the title product.

Prepare an analytical sample by recrystallization from methanol to give the pure product, M.P. 78–80° C.

$\lambda_{max.}^{KBr}$ 5.8μ $\lambda_{max.}^{EtOH}$ 276 mμ (ε 8,600)

*Analysis.*—Calcd. for $C_{20}H_{24}O_3$ (percent): C, 76.89; H, 7.74. Found (percent): C, 77.20; H, 7.68.

EXAMPLE 6 d-3-(methoxymethoxy)-17α-ethynyl-estra-1,3,5(10),8-tetraen-17β-ol

Dissolve d-3-(methoxymethoxy) - estra - 1,3,5(10),8-tetraen-17-one (625 mg.) in 30 ml. of anhydrous DMSO. Pass dry acetylene gas through the suspension for 1 hour. Add lithium acetylide-ethylene diamine (1.0 g.) in 0.5 g. portions 1½ hr. apart. Stir and pass acetylene gas for a further 1½ hours then pour the mixture into ice water and let stand for 1 hour. Extract the mixture with ether. Remove the dry ether in vacuo and dissolve the residue in ether. Filter the extract through a cotton plug. Remove the ether in vacuo and pump the residue to a glass to get 175 mg. of title product, $\lambda_{max.}^{KBr}$ 2.98, 3.00μ.

EXAMPLE 7

The procedure of Example 1 is repeated, substituting for chloromethyl methyl ether, stoichiometrical amounts of the following (lower)alkoxy halomethyl ethers:

$R^1$—O—$CH_2$hal

| $R^1$: | Hal |
|---|---|
| $CH_3$ | Br |
| $CH_3$ | F |
| $CH_3$ | I |
| $CH_3CH_2$ | Cl |
| $CH_3CH_2CH_2$ | Cl |
| $(CH_3)_2CHCH_2CH_2$ | Br |
| $CH_3(CH_2)_4CH_2$ | Cl |

The following 3-(lower)alkoxymethoxyestra-1,3,5(10)-trien-17-ones are obtained:

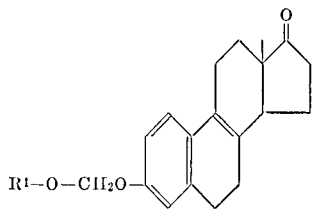

$R^1$ $CH_3$
$CH_3CH_2$
$CH_3CH_2CH_2$
$(CH_3)_2CHCH_2CH_2$
$CH_3(CH_2)_4CH_2$

EXAMPLE 8

The procedure of Example 1 is repeated substituting for dl-3-hydroxyestra-1,3,5(10),8-tetraen-17-one, stoichiometrical amounts of the following A-ring aromatic steroids:

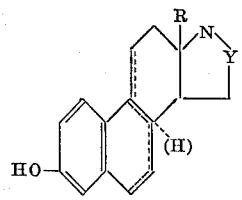

| R | X | Y | B— or C— ring Unsaturation |
|---|---|---|---|
| CH₃ | \C(OH)(C≡CH) | CH₂ | No. |
| CH₃CH₂ | \C(OH)(H) | CH₂ | No. |
| CH₃CH₂ | \C(OH)(C≡CCl) | CH₂ | No. |
| CH₃CH₂ | \C(OH)(C≡CBr) | CH₂ | No. |
| CH₃CH₂ | \C(OH)(CH=CH₂) | CH₂ | No. |
| CH₃CH₂ | \C(OH)(CH₂CH₃) | CH₂ | No. |
| CH₃CH₂ | \C(O—)(O—) [epoxide] | CH₂ | No. |
| CH₃CH₂ | \C=O | CH₂ | Δ⁶—. |
| CH₃CH₂ | \C=O | CH₂ | Δ⁷—. |
| CH₃CH₂ | \C=O | CH₂ | Δ⁹⁽¹¹⁾—. |
| CH₃CH₂ | \C=O | CH₂ | Δ⁶,⁸⁽⁹⁾—. |
| CH₃CH₂ | \C(OH)(H) | α-hydroxymethylene | No. |
| CH₃CH₂ | \C(OH)(H) | β-hydroxymethylene | No. |
| (CH₃)₂CH | \C=O | CH₂ | No. |
| CH₃(CH₂)₄CH₂ | \C=O | CH₂ | No. |

The following 3-methoxymethoxy-13-alkyl-8-isogona-1,3,5(10)-triene compounds (and dehydro analogs) are obtained:

| R | X | Y | B— or C— ring Unsaturation |
|---|---|---|---|
| CH₃ | \C(OH)(C≡CH) | CH₂ | No. |
| CH₃CH₂ | \C(OH)(H) | CH₂ | No. |
| CH₃CH₂ | \C(OH)(C≡CCl) | CH₂ | No. |
| CH₃CH₂ | \C(OH)(C≡CBr) | CH₂ | No. |
| CH₃CH₂ | \C(OH)(CH=CH₂) | CH₂ | No. |
| CH₃CH₂ | \C(OH)(CH₂CH₃) | CH₂ | No. |
| CH₃CH₂ | \C(O—)(O—) [epoxide] | CH₂ | No. |
| CH₃CH₂ | \C=O | CH₂ | Δ⁶—. |
| CH₃CH₂ | \C=O | CH₂ | Δ⁷—. |
| CH₃CH₂ | \C=O | CH₂ | Δ⁹⁽¹¹⁾—. |
| CH₃CH₂ | \C=O | CH₂ | Δ⁶,⁸⁽⁹⁾—. |
| CH₃CH₂ | \C(OH)(H) | α-hydroxymethylene | No. |
| CH₃CH₂ | \C(OH)(H) | β-hydroxymethylene | No. |
| (CH₃)₂CH | \C=O | CH₂ | No. |
| CH₃(CH₂)₄CH₂ | \C=O | CH₂ | No. |

EXAMPLE 9

The procedure of Example 1 is repeated, substituting for sodium methoxide, stoichiometrical amounts of the following alkali metal and alkaline earth metal methoxides: lithium methoxide, potassium methoxide and calcium methoxide. Substantially the same results are obtained.

EXAMPLE 10 d-17α-ethynyl-3-(methoxymethoxy)-8α-estra-1,3,5(10)-trien-17β-ol

Dissolve d-3-(methoxymethoxy-8α-estra-1,3,5(10)-trien-17-one (prepared by alkylating the sodium salt of d-3-hydroxy-8α-estra-1,3,5(10)-trien-17-one with chloromethyl methyl ether, 1.8 g.) in dry dimethyl sulfoxide (80 ml.) and saturate with a stream of dry acetylene with stirring over a period of one half hour. Add 3 portions of lithium acetylide ethylene diamine complex (2.0 g.) at ¾ hour intervals. After an elapsed time of three hours pour the reaction on ice and extract with ether. Wash dry and evaporate the ether layer and pass the residue in benzene through a short pad of fluosilicate. Completely remove the solvent to provide the product as a gum (1.60 g.);

$\lambda_{max.}^{film}$ 2.89, 3.06μ.

*Analysis.*—$C_{22}H_{28}O_3$ requires (percent): C, 77.61; H, 8.29. Found (percent): C, 77.32; H, 8.34.

$[\alpha]_D^{24} = -52°$ (c.=1, dioxane). This material can be obtained as a crystalline solid, M.P. 95–97° C. by trituration with isopropanol-petroleum ether.

EXAMPLE 11 d-13-ethyl-17α-ethynyl-3-(methoxymethoxy)-8α-gona-1,3,5(10)-trien-17β-ol

Dissolve d-13-ethyl-3-(methoxymethoxy)-8α-gona-1,3,5(10)-trien-17-one (prepared by alkylating the sodium salt of d-13-ethyl-3-hydroxy-8α-gona-1,3,5(10)-trien-17-one in tetrahydrofuran with chloromethyl methyl ether, 5.5 g.) in dry dimethylsulfoxide (200 ml.) saturated with dry acetylene and add 3 portions of lithium acetylide ethylene diamine complex 2.5 g. at ¾ hour intervals. After stirring for three hours, in a stream of acetylene pour the reaction mixture on ice, extract with ether and wash dry and evaporate the ether layer. Pass the residue in 50% benzene-hexane through fluosilicate and crystallize the contents of the eluate with isopropanol-petroleum ether to obtain the product (0.625 g.), M.P. 111–113° C.;

$\lambda_{max.}^{KBr}$ 2.94, 3.09, 8.69, 10.20μ; $[\alpha]_D^{24} = -67°$ (c.=2, dioxane).

*Analysis.*—$C_{23}H_{30}O_3$ requires (percent): C, 77.93; H, 8.53. Found (percent): C, 77.89; H, 8.77.

Obtain a second crop from the mother liquors (2.15 g., M.P. 116–118° C.).

EXAMPLE 12 d-13-ethyl-3-(methoxymethoxy)-17α-methyl-8α-gona-1,3,5(10)-trien-17β-ol

Dissolve d-13-ethyl-3-(methoxymethoxy)-8α-gona-1,3,5(10)-trien-17-one (prepared as described in Example 11, 1.5 g.) in absolute ether and add methyl lithium in ether (50 ml. of 5.1%) and stir for 16 hours. Add aqueous ammonium chloride and wash dry and evaporate the ether layer. Treat the residue with hydroxyl amine hydrochloride in pyridine to remove residual starting material and filter through fluosilicate in benzene. Crystallize the residue with petroleum ether to obtain the product (0.360 g.), M.P. 80–82° C.;

$\lambda_{max.}^{KBr}$ 2.92, 8.65, 9.95μ; $[\alpha]_D^{24} = -10°$ (c.=1, dioxane).

*Analysis.*—$C_{22}H_{32}O_3$ requires (percent): C, 76.70; H, 9.36. Found (percent): C, 76.72; H, 9.60.

We claim:

1. A compound selected from the $\Delta^6$-, $\Delta^7$-, $\Delta^{8(9)}$-, $\Delta^{9(11)}$- and $\Delta^{6,8(9)}$ - dehydro - 3-(lower)alkoxymethyleneoxy-13-(lower)alkyl-gona-1,3,5(10)-triene series and 8-isogona analogs thereof of the formula:

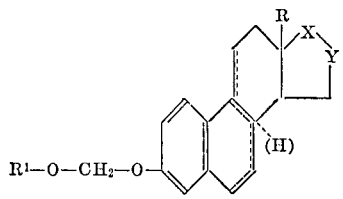

wherein R and $R^1$ are (lower)alkyl; X is

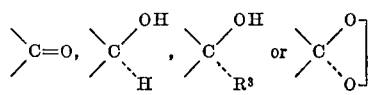

$R^3$ is (lower)alkyl, (lower)alkenyl, (lower)alkynyl or halo(lower)alkynyl; and Y is methylene or hydroxymethylene, and the broken lines indicate unsaturation.

2. A compound as defined in claim 1 which is dl-3-(methoxymethoxy)estra-1,3,5(10),8-tetraen-17-one.

3. A compound as defined in claim 1 which is dl-3-(methoxymethoxy) - 17α - ethynylestra - 1,3,5(10),8-tetraen-17β-ol.

4. A compound as defined in claim 1 which is dl-13-ethyl - 3 - (methoxymethoxy) - 8α-gona-1,3,5(10)-trien-17-one.

5. A compound as defined in claim 1 which is dl-13-ethyl - 3 - methoxymethoxy) - 17α-ethynyl-8α-gona-1,3,5(10)-trien-17β-ol.

6. A compound as defined in claim 1 which is d-3-(methoxymethoxy)estra-1,3,5(10),8-tetraen-17-one.

7. A compound as defined in claim 1 which is d-3-(methoxymethoxy) - 17α - ethynylestra - 1,3,5(10),8-tetraen-17β-ol.

8. A compound as defined in claim 1 which is d-17α-ethynyl - 3 - (methoxymethoxy)-8α-estra-1,3,5(10)-trien-17β-ol.

9. A compound as defined in claim 1 which is d-13-ethyl - 17α - ethynyl - 3 - (methoxymethoxy)-8α-gona-1,3,5(10)-trien-17β-ol.

10. A compound as defined in claim 1 which is d-13-ethyl - 3 - (methoxymethoxy)-17α-methyl-8α-gona-1,3,5(10)-trien-17β-ol.

References Cited

UNITED STATES PATENTS 3,374,251  3/1968  Cross.

HENRY A. FRENCH, Primary Examiner

U.S. Cl. X.R.

260—239.55, 397.45, 397.5, 999